United States Patent
Funseth et al.

(10) Patent No.: US 8,844,838 B2
(45) Date of Patent: Sep. 30, 2014

(54) SPRAYER PULSING NOZZLE FLOW CONTROL USING ROTATIONAL STEP POSITIONS

(75) Inventors: Travis G. Funseth, Ankeny, IA (US); David S. Mercer, W Des Moines, IA (US); Richard A. Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 419 days.

(21) Appl. No.: 13/333,541

(22) Filed: Dec. 21, 2011

(65) Prior Publication Data

US 2013/0161413 A1    Jun. 27, 2013

(51) Int. Cl.
*B05B 1/08* (2006.01)
*B05B 1/20* (2006.01)
*B05B 9/06* (2006.01)
*F16K 31/04* (2006.01)
*F16K 31/02* (2006.01)

(52) U.S. Cl.
USPC ............... 239/100; 239/68; 239/99; 239/101; 239/159; 251/129.11

(58) Field of Classification Search
CPC ............ B05B 1/08; B05B 1/083; B05B 9/06; B05B 12/02; B05B 12/06; A01M 7/005; A01M 7/006; A01M 7/0089; F16K 3/06; F16K 3/08; F16K 3/085; F16K 31/041; F16K 31/042

USPC ............... 239/67, 68, 99, 100, 101, 159, 164, 239/170, 225.1, 263.1, 380, 396, 540, 569; 251/129.11; 111/127

See application file for complete search history.

(56) References Cited

U.S. PATENT DOCUMENTS

| | | | |
|---|---|---|---|
| 4,058,260 A | 11/1977 | Lestradet | |
| 4,907,516 A * | 3/1990 | Rogers | ........................... 111/127 |
| 5,134,961 A | 8/1992 | Giles et al. | |
| 6,142,084 A * | 11/2000 | Hatlo | ............................ 111/127 |
| 2002/0092928 A1 | 7/2002 | Conroy | |
| 2009/0184182 A1* | 7/2009 | Beeren | ....................... 239/581.1 |
| 2010/0288855 A1 | 11/2010 | Lev | |
| 2012/0187219 A1* | 7/2012 | Criscione, II et al. | ......... 239/436 |

OTHER PUBLICATIONS

European Search Report, dated Apr. 29, 2013 (4 pages).

* cited by examiner

*Primary Examiner* — Darren W Gorman

(57) ABSTRACT

An agricultural sprayer spray head is adapted for being mounted to a spray boom together with a plurality of like, equally spaced spray heads. Each spray head includes a body containing a flow control member mounted for rotation about an axis and including a fluid control passage arrangement located for effecting an intermittent connection between a fluid inlet leading to, and an outlet leading from the body as the control member is oscillated or rotated by a powered motor so as to effect a pulsing flow through said control passage arrangement. The powered motor operates at a speed controlled by various input parameters including vehicle speed and field and crop conditions so as to maintain a desired spray application rate.

7 Claims, 2 Drawing Sheets

SPRAYER PULSING NOZZLE FLOW CONTROL USING ROTATIONAL STEP POSITIONS

FIELD OF THE INVENTION

Figure 1:
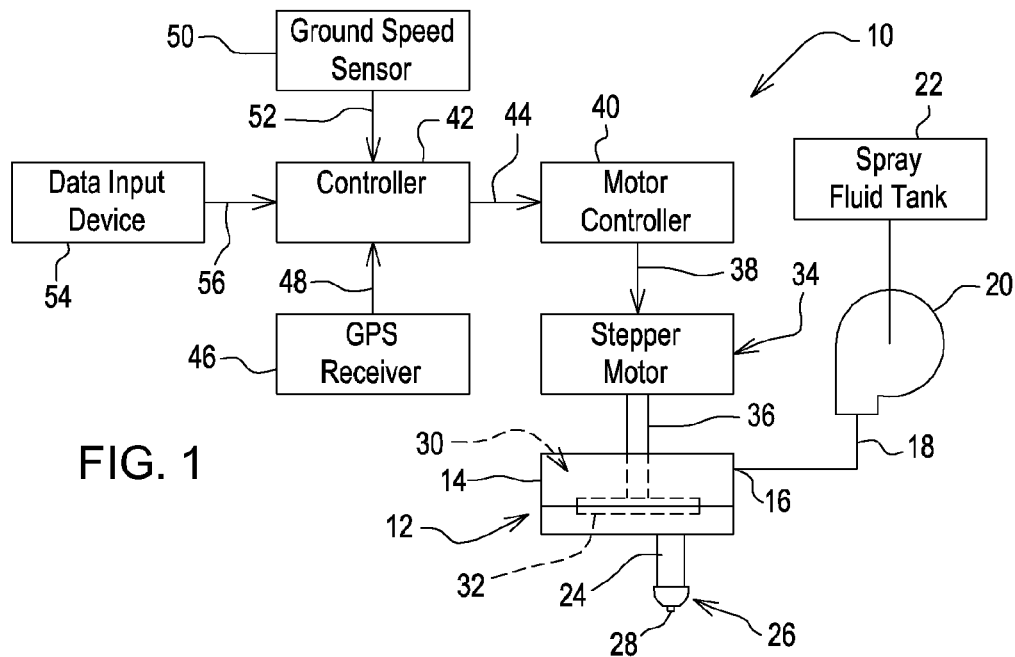

The present invention relates to agricultural sprayers, and more specifically relates to automatically controlling the spray rate from a spray head for compensating for changes in vehicle ground speed so as to maintain a constant application rate.

BACKGROUND OF THE INVENTION

Agricultural sprayers use nozzles for spraying a liquid which may be a fertilizer, a pesticide, a fungicide, an insecticide onto agricultural crops. Traditional nozzles consist of an orifice with geometry controlling the flow rate, droplet size and spray pattern to the target. The flow rate through the orifice is mainly a function of the orifice area and geometry as well as the fluid pressure at the orifice (i.e., pressure just prior to the orifice). Since the orifice size is fixed, i.e., the orifice geometry doesn't change, the most common way to influence the flow rate through the nozzle is by changing pressure.

Changing the fluid pressure at the nozzle to influence flow rate changes has become common place on sprayers in order to allow for variable vehicle speed. Systems change the flow rate proportional to the vehicle speed in order to keep the application rate the same.

However, using the traditional fixed orifice nozzle has some limitations. The pressure versus flow relationship is a squared function. To double the flow requires increasing the pressure by a factor of four times. Unfortunately, changing pressure also changes atomization dynamics resulting in an impact on spray quality. Spray quality characteristics, namely, droplet size and the spray angle, both become smaller as pressure increases. These changes can negatively impact spray deposit and spray drift. So, the need for a variable rate nozzle with uniform pressure has emerged.

In recent years, pulse width modulation (PMW) has been used to control nozzle flow rate while maintaining constant pressure. The idea uses a solenoid coil and armature valve configuration to open and close flow to the nozzle. The valve is cycled between open (full pressure) and closed (no pressure) positions at a fast pulse rate. Changing the effective flow rate is done by varying the portion of open time to the portion of closed time. So, if a nozzle that sprays one gallon per minute is open only 50% of the time, the result will be an effective flow rate of only a half gallon per minute. In this arrangement, the duty cycle of open time is a linear relationship with effective flow rate. As the vehicle speed diminishes, the duty cycle decreases to match the flow rate required, while maintaining a constant pressure. U.S. Pat. No. 5,134,961 discloses a nozzle arrangement of this type which modulates nozzle flow by intermittent operation of an electrical solenoid valve attached to and located directly upstream of a spray nozzle. By cycling the valve open and closed, the flow rate through the nozzle is controlled in an analogous on/off manner.

However, the PWM technology has some inherent problems. Poor coefficient of variation in the travel direction (up to 65% in one study) is caused as a result of turning the flow to the nozzle "off" and "on" during travel. It is known in the art to pulse the nozzles at 10 Hz and alternate phase 180° on every other nozzle to blend the spray. A faster pulse is recommended to help with the coefficient of variation. But, the open/close response time of the solenoid armature poses a limitation to pulsing faster. Thus, it is desired to find a way to pulse faster so as to improve the coefficient of variation.

One further drawback of using a pulsing solenoid-operated valve to control flow to the nozzle is that the electrical current draw is rather high and requires a sprayer vehicle capable of handling high electrical current loads.

SUMMARY OF THE INVENTION

According to the present invention, there is provided an improved spray head arrangement and more particularly, there is provided a spray head arrangement including a nozzle to which a supply of spray fluid may be automatically quickly switched or pulsed between "on" and "off" conditions.

An object of the invention is to provide a spray head arrangement including a flow control valve arrangement which is capable of being controlled to quickly change the flow rate through the nozzle in order to compensate for changes in sprayer vehicle speed, crop and/or field conditions, while overcoming the drawbacks, noted above, associated with the prior art flow control valve arrangements. This object is accomplished by providing the spray head arrangement with a body in which a flow control member of a switching valve arrangement is mounted for rotation and includes a flow passage arrangement for intermittently routing flow between a fluid inlet and a fluid outlet provided in the body, with the outlet being coupled for routing fluid to a nozzle carried by the body.

A preferred embodiment of the spray head arrangement for achieving the aforementioned object includes a flow control member defined by a disk mounted for rotation between the fluid inlet and fluid outlet leading to the spray nozzle, the disk containing one or more control openings which are constantly in fluid communication with the fluid inlet and move into and out of alignment with the fluid outlet as the disk is rotated by an electric stepper motor, with the motor being controlled to pulse flow to the outlet at a rate which compensates for changes in sprayer vehicle speed so as to maintain a desired spray application rate.

The above and other objects of the invention will become apparent from a reading of the ensuing description together with the appended drawings.

BRIEF DESCRIPTION OF THE DRAWINGS

FIG. 1 is a schematic illustration of a control system for varying nozzle spray rate in accordance with spray vehicle speed by on/off pulsing of spray fluid supplied to a fixed rate nozzle so as to maintain a constant application rate.

FIG. 2 is a perspective view of a pulsing spray head constructed in accordance with the principles of the present invention.

FIG. 3 is a vertical sectional view taken through the spray head shown in FIG. 2.

FIG. 4 is a top view of the flow control disk shown in FIG. 3.

DESCRIPTION OF THE PREFERRED EMBODIMENT

Referring now to FIG. 1, there is shown a schematic of a control system 10 for maintaining the application rate of an agricultural spray to a field substantially constant at different sprayer vehicle ground speeds. The control system 10 comprises a plurality of spray heads 12 (only one shown) which would be mounted in evenly spaced relationship to each other along the length of a sprayer boom (not shown). Each of the spray heads 12 includes a manifold body 14 having an inlet 16 coupled for receiving spray fluid from a supply tube 18 carried by the spray boom and coupled to an outlet of a supply pump 20 having an inlet coupled to a source of spray fluid contained within a spray fluid tank 22 carried by the sprayer vehicle. A tubular nozzle connector 24 includes an upper end secured to a lower surface of the manifold body 14 in fluid communication with an outlet opening described below. A conventional spray nozzle 26 is coupled to a lower end of the nozzle connector 24 by a bayonet connection, for example, and includes a conventional spray tip 28 having a given flow rate for a given spray fluid supply pressure. It is to be understood that other nozzle arrangements could be used for disposing the nozzle in fluid communication with an outlet opening.

A flow control valve arrangement 30 is located within the body 14 and includes a circular flow control disk 32 mounted for rotation for effecting a pulsing flow of spray fluid to the spray nozzle 26, in a manner described below in detail.

The flow control disk 32 is automatically rotated by operation of a powered motor, which may be an electrically controlled pneumatic, hydraulic or electric motor, with an electrically powered, reversible stepper motor 34 being preferred. The motor 34 is mounted to a central location of a top surface of the body 14 and having an output shaft 36 coupled, in a manner described in more detail below, to a central location of the flow control disk 32. The motor 34 is electrically coupled, as by a motor control signal lead 38, for receiving electrical control pulses from a motor controller 40 as commanded by an electronic controller 42 coupled to the motor controller 40 by an output signal lead 44. The electronic controller 42 may be a microprocessor having a memory into which field mapping data, for example, relating to potential yield, soil type, soil nutrients, soil moisture content, weeds, diseases, and field topography, may be stored along with corresponding spray fluid application rates. To go along with this mapping data, a GPS receiver 46 is coupled to the controller 42 by a position input signal lead 48. Also stored in the memory of the controller 42 is data relating an application rate of the nozzle tips 28 to ground speed of the spray vehicle. To go along with this data, a spray vehicle ground speed sensor 50 is coupled by a ground speed input signal lead 52. The type of spraying being done and the corresponding nozzle tips being used can be keyed into the memory of the controller 42 by a manually-operable data input device 54 that is coupled to the controller 42 by a data input lead 56.

Figure 2:
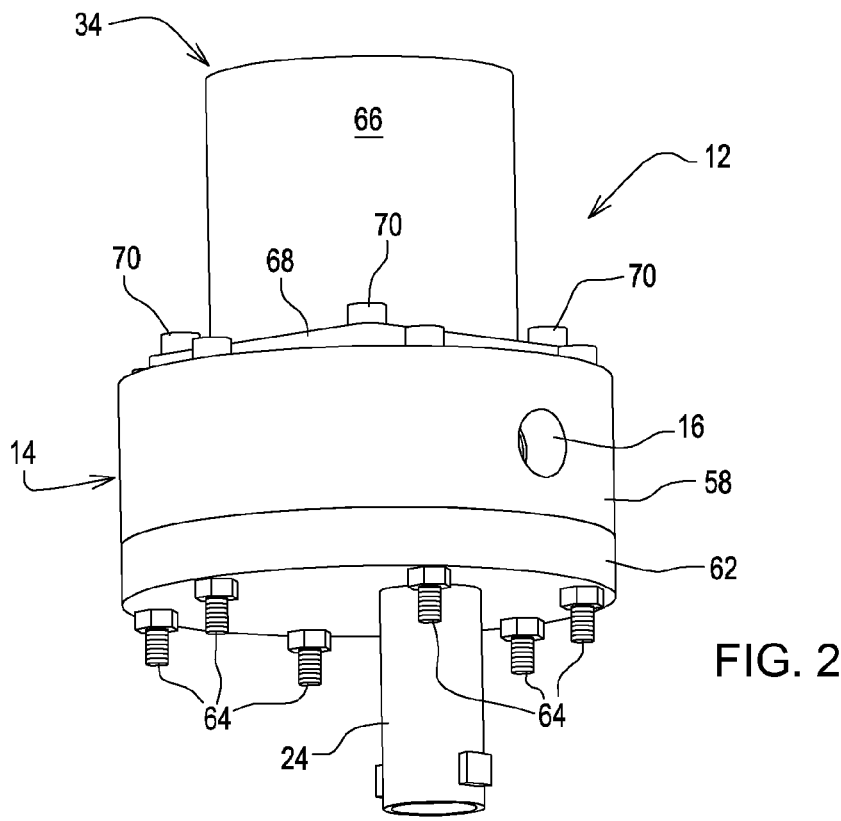
Figure 3:
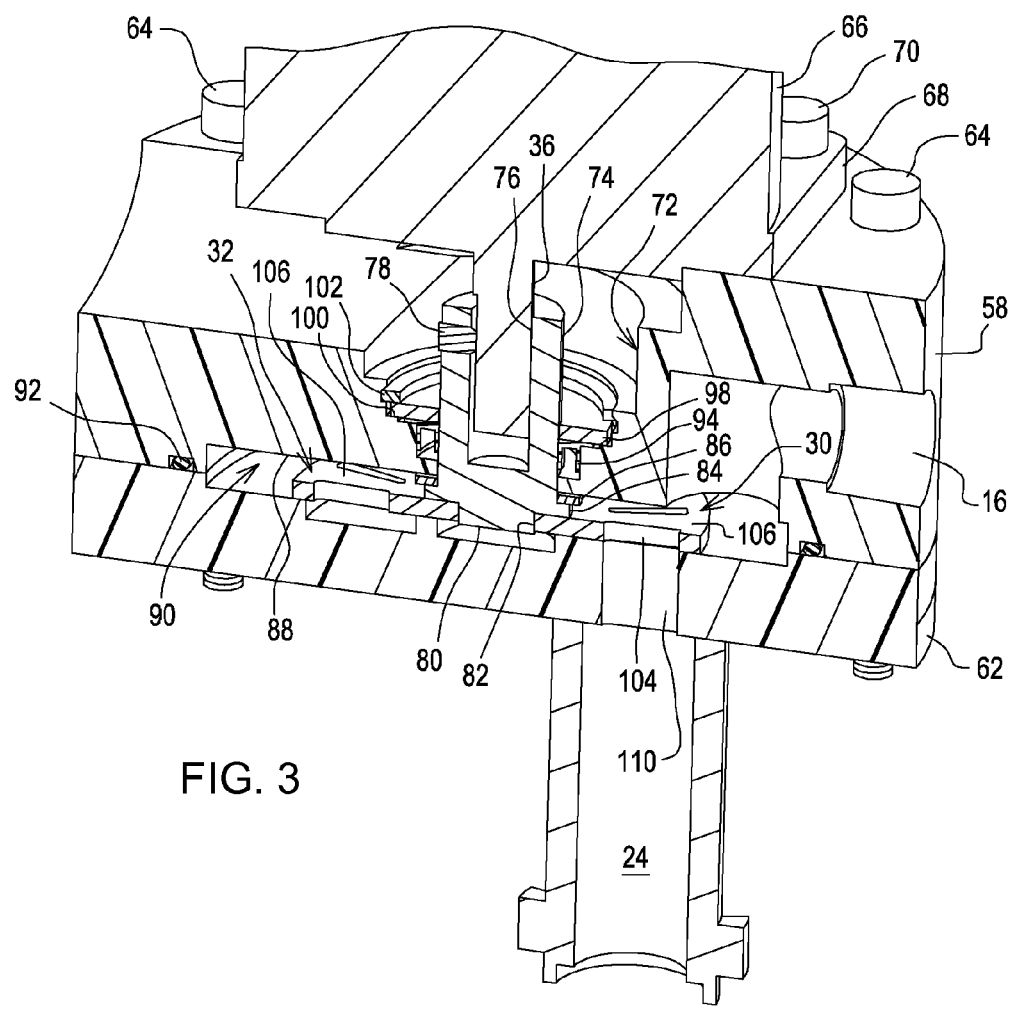

Referring now to FIGS. 2 and 3, there is shown the spray head 12 of FIG. 1, but with the nozzle 26 and spray tip 28 omitted. The spray head body 14 includes a cylindrical upper inlet section 58 and a cylindrical bottom plate 62 all clamped together by a plurality of bolt and nut assemblies 64 arranged in a circular pattern. Instead of the bolt and nut assemblies 64, the upper and lower sections 58 and 62 could be designed to be screwed together or interlocked with each other, for example. The stepper motor 34 includes a cylindrical body 66 having a lower region joined to a horizontal flange arrangement 68 secured against a top surface of the upper inlet section 58 of the body 14 by screw fasteners 70.

As can best be seen in FIG. 3, a central location of the inlet section 58 of the body 14 is provided with a stepped cylindrical through bore 72. The output shaft 36 of the stepper motor 34 is disposed along a central axis of the bore 72 and is connected to the flow control disk 32 by a shaft coupler 74 having a blind bore 76 extending axially from an upper end of the coupler and receiving the output shaft 36, with the coupler 74 being secured for rotation with the shaft 36 by being keyed or having a splined connection (not shown) in a well known manner and being axially secured by a setscrew 78. A lower end section 80 of the shaft coupler 74 has a non-round cross-section, here shown as being square, but which may be round with a flat, for example, received in a complementary shaped opening 82 located at the axial center of the disk 32. The shaft coupler 74 further includes an annular flange 84 engaging a top surface of the flow control disk 32. One or more circular annular shims 86 is (are) located on a top side of the flange 84 and takes up any space between a top surface 88 of an annular fluid chamber 90 defined by a circular recess formed in the bottom of the inlet section 58 and the top of the bottom plate 62 of the body 14, the chamber 90 being in fluid communication with the spray fluid inlet 16 and extending over the top of the flow control disk 32. Leakage of spray fluid from the chamber 90 along an annular flat interface established between a flat top of an outer annular region of the bottom plate 62 and a flat bottom of an outer annular region of the inlet section 58 of the manifold body 14 is prevented by an o-ring seal 92 located in an annular seal groove provided in the underside of the inlet section 58 outwardly of the chamber 90. Leakage of fluid along an annular interface between the shaft coupler 74 and the surface of through bore 72 is prevented by a low friction, annular shaft seal 94 located in an annular seal receptacle 96 defined by the through bore 72. An annular seal retainer plate 98 engages a top surface of the shaft seal 94 and is supported on an annular step surface 100 defined by through bore 72. The retainer plate 98 is held in place by a snap ring 102 that is received in an annular snap ring groove provided in a surrounding wall region of the through bore 72.

Figure 4:
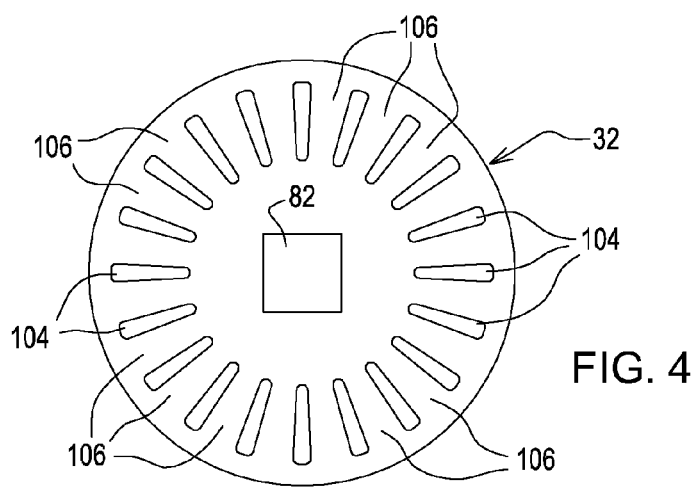

Referring now also to FIG. 4, it can be seen that the flow control disk 32 includes a plurality of identical radial slots 104 (twenty being shown) arranged in a concentric ring about the center of rotation of the disk 32 and being spaced an equal angular amount from each other by webs 106. As shown in FIG. 3, one of the radial slots 104 is shown in alignment with a fluid outlet 110 provided in centered relationship to an upper end of the tubular nozzle connector 24. Thus, an open flow condition is established between the inlet 16 and the nozzle 26 with spray tip 28 carried at the bottom of the connector 24, with it being noted that the webs 106 are sized so as to close off the fluid outlet 110 from receiving spray fluid when one of the webs is centered over the outlet 110.

In operation, the operator will first select the correct type and size of spray nozzle tip 28 for effectively performing the spray application at hand. The size of the nozzle tip 40 will depend upon the application rate (gallons/acre (GPA), ground speed (miles/hour (MPH), pressure in pounds/inch$^2$ (PSI) of the sprayed fluid at the nozzle and the planned effective width (W in inches) sprayed per nozzle). The manufacturer of the chosen spray product will normally provide a label stating the GPA recommended and, from this GPA, tables provided by a nozzle/tip manufacturer can be entered for choosing the correct nozzle tip for achieving this GPA at an appropriate maximum ground speed in MPH and nozzle pressure range. Thus, spray operation will be conducted using a standard spray nozzle tip operating at a constant spray fluid pressure for applying spray at the recommended spray application rate.

Once the nozzle tip 28 is selected for each of the spray heads 12, the operator will use the input device 54 to load the memory of the controller 42 with appropriate data correlating the desired spray application rate with the pulsing rate of the stepper motor 52 required for turning the flow to the nozzle 26 "on" and "off" for compensating for variances in spray vehicle speed from the rated speed of the nozzle tip 28. Assuming that the appropriate nozzle spray tip 28 is rated for applying spray at a recommended 10.0 GPA at a nozzle pressure of 40 PSI (a lesser spray fluid pressure may be required if conditions are windy and droplet size has to be increased) and at an appropriate spray vehicle ground speed of 14 MPH, once spraying operation commences, the spray vehicle ground speed sensor 50 will supply the electronic controller 42 with a ground speed signal representative of the ground speed. The electronic controller 42 will compare this ground speed signal with the appropriate maximum ground speed of 14 MPH and a ratio equal to 14 MPH/sensed speed will be derived and used to generate a motor control signal for controlling the flow control disk 32 such that an appropriate decrease in spray rate occurs to compensate for the lower sprayer travel speed. For example, assuming that the motor 34 is designed to advance the flow control disk through 9° steps, it will be appreciated that, since the disk 32 has twenty slots 104 separated by twenty webs 106, the stepper motor 34 will operate in response to receiving consecutive electrical pulses to alternately open and close the flow path to the spray nozzle tip 28. Thus, if the sensed speed is 2 MPH, then the ratio will be 7/1 and the pulse rate of the stepper motor will be established to cause the time between consecutive control current pulses to be such that the disk 32 is located in an open position supplying spray fluid to the nozzle spray tip 28 for a period of time which is seven times the amount of time that the disk 32 is located in a closed position blocking spray fluid from the nozzle spray tip 28. Thus, with the travel speed being 1/7 of the maximum desired speed of 14 MPH, the amount of time that the spray tip 28 is delivering spray is 7 times that when no spray is being delivered. Further, it is noted that the design of the stepper motor 34 would be chosen such that it can be easily controlled to operate so as to switch flow to the spray tip 28 at a rate which is up to 5 times the 10 hertz rate of the aforementioned solenoid control using PWM, with an attendant benefit of better spray coefficient of variation in the travel direction which means a more uniform spray deposit resulting in more effective results from spray application. Also loaded into memory are adjustments desired for different regions of a field as provided by a field map.

While the stepper motor 34 is described as rotating in one rotational direction only during spraying operation, it should be understood that in a case where the flow control member is a disk containing but one opening, a pulsing flow can be caused by switching the rotational direction of the motor either every other time or at some other set algorithm.

Having described the preferred embodiment, it will become apparent that various modifications can be made without departing from the scope of the invention as defined in the accompanying claims.

The invention claimed is:

1. A spray head, adapted for being mounted along an agricultural sprayer spray boom with a plurality of like spray heads, comprising: a spray head body defining a cavity; a flow control member being mounted in said cavity for rotation about a fixed axis and containing a fluid passage arrangement; said body being provided with a fluid inlet and a fluid outlet, and said fluid passage arrangement being so located relative to said inlet and outlet that it intermittently establishes a flow path between said inlet and outlet during movement of said flow control member; a nozzle coupled for receiving flow from said outlet; and a stepper motor being coupled to said flow control member for effecting movement of said flow control member about said axis for intermittently establishing said flow path between said inlet and outlet.

2. The spray head, as defined in claim 1, wherein said flow control member is a disk and said fluid passage arrangement includes at least one opening extending through said disk.

3. The spray head, as defined in claim 2, wherein said fluid passage arrangement includes a plurality of identical openings extending through said disk at equal angularly spaced locations, with the spacing between adjacent openings being filled by a web that blocks all flow from occurring through said outlet when none of said identical openings are aligned with said outlet.

4. A spray head for use in an agricultural sprayer, comprising: a body including a spray fluid inlet communicating with a fluid chamber including a bottom plate having a substantially planar top surface and containing a flow control outlet; a nozzle being mounted to said bottom wall for receiving fluid from said outlet; a circular flow control disk being located in said fluid chamber on said planar surface so as to be between said inlet and outlet; said disk being mounted for rotation about an axis spaced from said outlet a distance less than an outer diameter of said disk; said disk containing a plurality of identical, equi-angularly spaced flow control openings located so as to sequentially move into and out of register with said outlet during rotation of said disk; and an electric stepper motor having an output shaft coupled for selectively effecting rotation of said flow control disk so as to cause fluid to be supplied to said nozzle at a pulse rate determined by a rate at which control current pulses are sent to said motor.

5. An agricultural sprayer, comprising: at least one spray head including a valve arrangement for controlling flow between a spray fluid inlet and a spray fluid outlet; said valve arrangement including a circular flow control disk located between the fluid inlet and the fluid outlet and containing at least one opening which alternately establishes open and closed conditions, respectively permitting fluid flow, and blocking flow, between said fluid inlet and outlet as said flow control disk is rotated about a rotation axis; a spray nozzle being coupled in fluid communication with said fluid outlet and including a spray tip for spraying fluid at a recommended application rate when receiving spray fluid at a constant given pressure and when the sprayer is traveling at a maximum ground speed; and a stepper motor being coupled to said flow control disk for effecting step rotation of said control disk in response to receiving a pulsing control current; and a control system for said stepper motor including a motor control arrangement coupled for receiving a spray vehicle ground speed signal and for automatically controlling said stepper motor for causing the control disk to be stepped between said open and closed positions at a rate which compensates for said spray vehicle traveling at a speed below said maximum ground speed so as to maintain a constant spray application rate from said spray tip.

6. The agricultural sprayer, as defined in claim 5, wherein said stepper motor is designed for causing said control disk to be stepped alternately between said closed and open positions in single steps.

7. The agricultural sprayer, as defined in claim 5, wherein said flow control disk includes a plurality of flow control openings arranged equally spaced from each other about said rotation axis and includes a plurality of identical webs respectively located between adjacent ones of said flow control openings, the webs each being dimensioned for blocking flow through said fluid outlet when said control disk is in said closed position; and said stepper motor being designed for stepping a distance equal to 360°/2 (number of control openings).

* * * * *